United States Patent
Park et al.

(10) Patent No.: US 10,296,040 B2
(45) Date of Patent: May 21, 2019

(54) AUDIO DEVICES

(71) Applicant: HEWLETT-PACKARD DEVELOPMENT COMPANY, L.P., Houston, TX (US)

(72) Inventors: Chan Park, Houston, TX (US); Paul Roberto Lalinde, Houston, TX (US); Tony Moon, Houston, TX (US); Jose Ticy Lo, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/563,979

(22) PCT Filed: Jun. 17, 2015

(86) PCT No.: PCT/US2015/036125
§ 371 (c)(1),
(2) Date: Oct. 3, 2017

(87) PCT Pub. No.: WO2016/204739
PCT Pub. Date: Dec. 22, 2016

(65) Prior Publication Data
US 2018/0143661 A1    May 24, 2018

(51) Int. Cl.
  *G06F 1/16*    (2006.01)
  *H04R 1/02*    (2006.01)
  *H04R 3/00*    (2006.01)

(52) U.S. Cl.
  CPC ............... *G06F 1/16* (2013.01); *H04R 1/02* (2013.01); *H04R 3/00* (2013.01); *H04R 1/026* (2013.01); *H04R 2201/025* (2013.01); *H04R 2205/021* (2013.01); *H04R 2420/07* (2013.01); *H04R 2420/09* (2013.01)

(58) Field of Classification Search
  CPC ... G06F 1/1632; G06F 1/16; H04R 2205/021; H04R 2420/09; H04R 3/00; H04R 2420/07; H04R 1/1066; H04R 1/02; H04R 1/08; H04R 1/1016; H04R 1/1033; H04R 1/1041; H04R 1/105; H04R 1/1058
  USPC .......................................... 381/370, 380, 386
  See application file for complete search history.

(56) References Cited

U.S. PATENT DOCUMENTS

| D559,832 S | * | 1/2008 | Poandl .......................... D14/212 |
| 8,150,460 B1 | | 4/2012 | Curtis et al. |
| 9,055,156 B1 | * | 6/2015 | Sumsion .................. H04R 1/02 |
| 2005/0255895 A1 | | 11/2005 | Lee et al. |

(Continued)

FOREIGN PATENT DOCUMENTS

| CN | 203968300 | 11/2014 |
| JP | 615393 | 2/1994 |

(Continued)

OTHER PUBLICATIONS

Garrett; "Quirky Perch—Multi Phone Travel Dock with Removable Bluetooth Speaker"; Jan. 10, 2011; 4 pages.

*Primary Examiner* — Curtis A Kuntz
*Assistant Examiner* — Julie X Dang
(74) *Attorney, Agent, or Firm* — HPI Patent Department

(57) ABSTRACT

Examples of an audio device may comprise a speaker, a body having multiple sides, and an electrical communication feature disposed on each of the multiple sides. Each electrical communication feature may facilitate electrical communication between the audio device and an external device.

15 Claims, 4 Drawing Sheets

(56) References Cited

U.S. PATENT DOCUMENTS

| | | | |
|---|---|---|---|
| 2007/0223745 A1 | 9/2007 | Feng et al. | |
| 2010/0215203 A1 | 8/2010 | Sip | |
| 2013/0230202 A1 | 9/2013 | Widner et al. | |
| 2014/0097793 A1 | 4/2014 | Wurtz et al. | |
| 2014/0203661 A1* | 7/2014 | Dayan | H01F 38/14 307/104 |

FOREIGN PATENT DOCUMENTS

| | | |
|---|---|---|
| JP | 2003079061 A | 3/2003 |
| TW | M496308 | 2/2015 |

\* cited by examiner

AUDIO DEVICES

BACKGROUND

Electronic devices may engage with other devices in a variety of manners. Some electronic devices, which may be computing devices, may engage with supplemental devices, or accessories. Accessory devices may include audio devices which may emit audio signals at the instruction of the computing device with which the audio device is engaged. The audio signals may include audible sounds, such as music or video soundtracks, or other audible sounds. Computing devices may engage with, connect to, or communicate with the audio device through wired or wireless technology.

DETAILED DESCRIPTION

Electronic devices, including personal or mobile electronic devices, which may be computing devices, may engage with accessories, or supplemental devices. These accessory devices may also be electronic or computing devices. The accessory devices may, in some situations, be a docking station to structurally support, cradle, or hold the computing device in a certain position or orientation. Further accessory devices may be audio devices to receive and emit audio signals. The computing device may transmit audio signals to the audio device, which may then translate the signals into audible sounds such as music or video soundtracks, or other audible sounds, and emit the audible sounds.

It may be desirable, in some situations, to have an audio device that is portable. A portable audio device may be a wireless audio device, such that it can be moved from one location to another, uninhibited by a physical restraint to either location. A wireless audio device may have a battery that is capable of supplying current or power to the audio device, without the use of a power cord connecting the audio device to another power source, such as an electrical outlet on a wall. Further, the battery may be periodically charged to resupply it with sufficient current or power to continue supplying power to the audio device. The battery may be charged by plugging the battery into an external power source, such as a wall outlet, or another battery, for example. In some situations, it may be desirable to have a portable audio device that can be charged without the need to plug the audio device or its battery into an external power source.

Further, it may be desirable in some situations to position a portable audio device in multiple different orientations on a surface. Further, it may be desirable to have the ability to charge the battery of such a portable audio device without plugging the audio device in with a cord, regardless of the particular orientation that the audio device is disposed in.

Implementations of the present disclosure provide audio devices to engage with an external device. Examples of such audio devices may engage with the external device in multiple orientations. The example audio devices may be removable from the external device and be portable. Further, the example audio devices may be rechargeable by engaging the audio device with the external device in any of the multiple orientations. Further example audio devices may engage with an electronic device, such as a computing device. Example audio devices may be accessory devices for one or more computing devices, and, further, may receive and emit audio signals at the instruction of a computing device, through a wired or wireless connection with the computing device.

Figure 1:
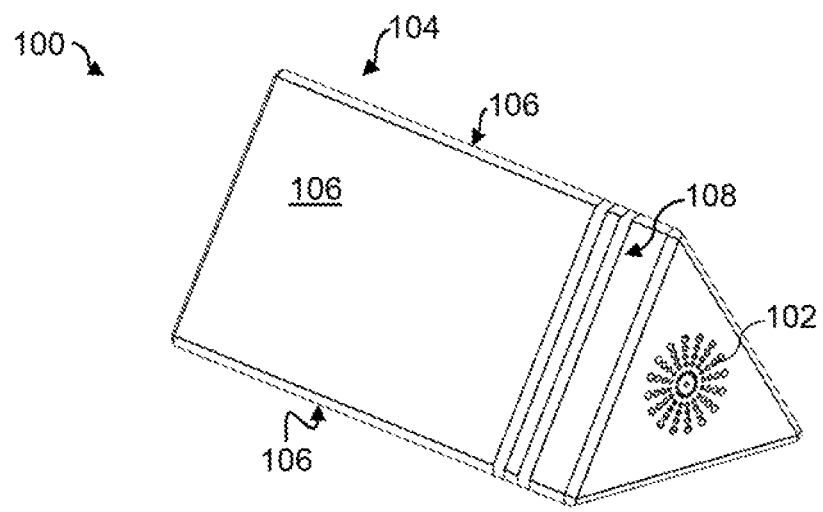
FIG. 1 is a perspective view of an example audio device.

Referring now to FIG. 1, a perspective view of an example audio device 100 is illustrated. The example audio device 100 may comprise a speaker 102, a body 104 having multiple sides 106, and an electrical communication feature 108 disposed on each of the multiple sides 106. The speaker 102 may be disposed wholly or partially within the body 104 of the audio device 100, such that the body 104 encloses the speaker 102. The speaker 102 may be an electromechanical device which can produce sound. Further, the speaker 102 may be an electroacoustic transducer, capable of receiving an electrical signal and converting the signal into a sound. Further, the speaker 102 may emit audio signals such as audible sounds through an acoustic vent in the body 104. The acoustic vent, in some implementations, may be disposed on one end cap of the body 104. In further implementations, an additional acoustic vent may be disposed on another end cap, on a generally opposite side of the body 104 from the first acoustic vent. In yet further implementations, the audio device 100 may comprise more than one speaker 102, such as two speakers, for example. Each of the two speakers may emit audible sounds through the same or a separate acoustic vent. In some implementations, the audio device 100, may have a speaker disposed at each end of the body 104, with each end cap of the body having an acoustic vent.

The example audio device 100 may include a body 104 having multiple sides 106. In some implementations, the body 104 may be a rigid or semi-rigid structure enclosing the speaker 102, as well as other electrical and mechanical components. In some implementations, the body 104 may protect the components disposed within from damage due to impact, electrical interference, moisture, or other external factors. In some implementations, the body 104 may have a generally elongate shape, such as a shape having a length that is longer than its width. In further implementations, the body 104 may have three sides 106, such that the body 104 has a triangular cross-section, or resembles a triangular prism. In some implementations, the body 104 may have a cross-section of an equilateral triangle, while in other implementations, the cross-section may be non-equilateral triangle. In yet further implementations, the body 104 may have only one side, such that the body 104 has a cylindrical geometry, with a circular cross-section. In some implementations, the body 104 may have more than three sides 106, with a cross-sectional geometry corresponding to the number of sides 106. Each of the multiple sides 106 may be generally flat and rigid, such that the audio device 100 can rest on a surface on any of the multiple sides 106. In further implementations, the body 104 may comprise a center section and two end caps to be assembled on to either end of the center section. The center section and the end caps may comprise a metallic or polymer material. In some implementations, the body 104 may be formed by injection molding a polymer material.

The example audio device 100 may include an electrical communication feature 108 on each of the multiple sides 106. Each of the electrical communication features 108 may facilitate electrical communication between the audio device 100, or a component within, and an external device. In the event that the body 104 has only one side 106, such as a cylinder, the audio device 100 may include multiple electrical communication features 108 disposed around the circumference of the body 104 on the one side 106. In some implementations, each of the electrical communication features 108 may comprise a pair of electrical contacts to separately, that is, apart from the other sides, engage with a pair of complementary electrical contacts disposed on the external device. The pairs of electrical contacts may each be able to receive and/or transmit an electrical signal or current from and to the external device. In some implementations, the pairs of electrical contacts may each comprise a positive and a negative terminal or contact. Each pair of electrical contacts may be able to receive a current from the external device and transmit the current to a battery of the audio device 100, such that the battery can charge or recharge. Further, each pair of electrical contacts may be able to receive an electrical signal from the external, device, and transmit the signal to electronic components of the audio device 100 wherein the electrical signal may include audio signals or instructions for the audio device 100 to emit audio signals such as audible sounds.

In yet further implementations, one or more of the pairs of electrical contacts may comprise a pair of conductive channels on the respective side 106. In some implementations, each channel of the pair of conductive channels may function as an electrical terminal or contact. The pair of conductive channels may extend the entire width of the respective side, or the corresponding side 106 upon which the channels are disposed. In some implementations, each channel of each pair of conductive channels may be stamped into the body 104 of the audio device 100. The conductive channels may, further, be coated or plated with a material to withstand corrosion and improve electrical contact and communication, such as, for example, nickel. In further implementations, each of the pairs of electrical contacts on the multiple sides 106 may include a pair of conductive channels that extend the entire width of the respective side 106, such that all of the pairs of conductive channels are connected, share conductivity, and together create a pair of channels that extend circumferentially, that is, extend around the entire circumference or perimeter of the body. It should be noted that, in this context, circumference may refer to a direction extending around all of the sides of the body 104, regardless of the number of sides 106. In other words, circumference should not be limited to only describing a direction along a circular cross-section, but a direction along the perimeter of any cross-sectional shape. Further, each channel of the pair of channels extending around the entire circumference of the body may be electrically isolated from the other channel of the pair of channels, such that each channel can receive, transmit or conduct a different current or electrical signal than the other channel. One of the channels of the pair of channels extending around the entire circumference of the body 104 may be a positive terminal or contact to engage with a positive electrical contact of the pair of complementary electrical contacts on the external device, while the other channel of the pair of channels may be a negative contact to engage with a negative electrical contact of the pair of complementary electrical contacts on the external device.

Figure 2A:
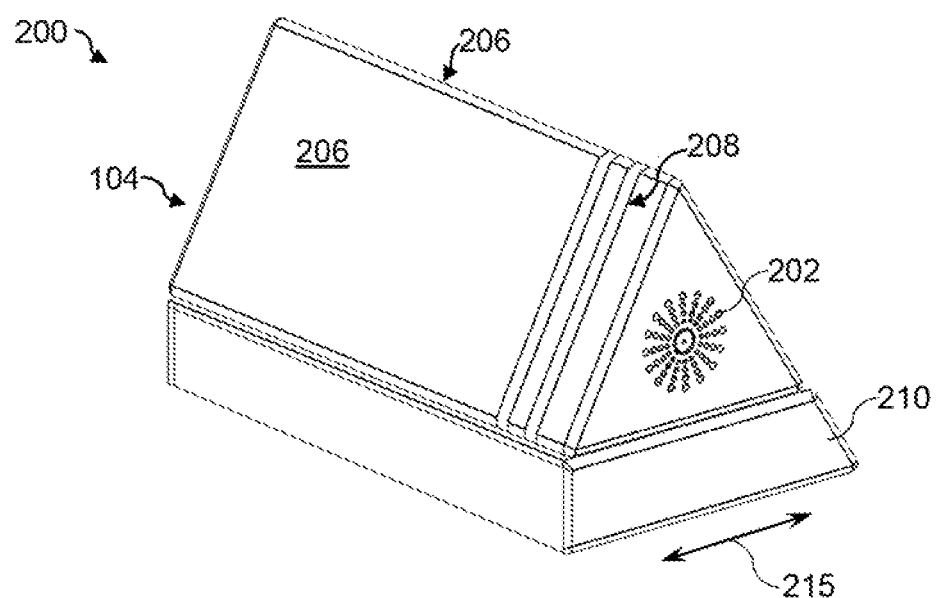
FIG. 2A is a perspective view of an audio device system comprising an example audio device engaged with an external device.
Figure 2B:
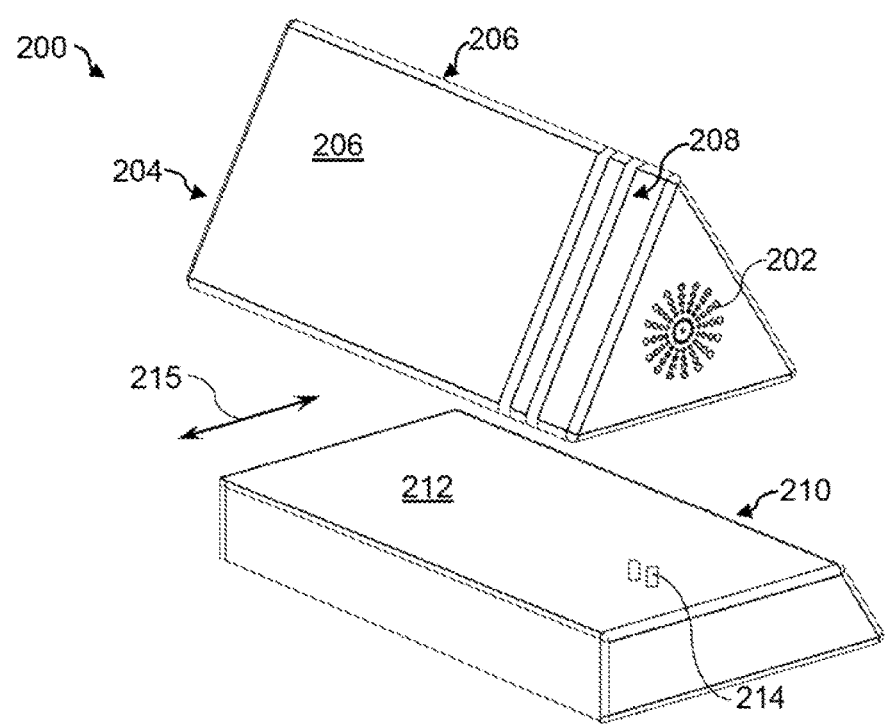
FIG. 2B is an exploded, perspective view of an audio device system comprising an example audio device engaged with an external device.

Referring now to FIG. 2A, a perspective view of an example audio device system comprising an example audio device 200 engaged with an external device 210 is illustrated. Referring additionally to FIG. 2B, an exploded, perspective view of the example audio device system is illustrated. Example audio device 200 may be similar to example audio device 100. Further, the similarly named elements of example audio device 200 may be similar in function and/or structure to the elements of example audio device 100, as they are described above. In some implementations, the external device 210 may be a charging base 210. The charging base 210 may, thus, be able to recharge a battery within the audio device 200 when the audio device 200 is engaged with the charging base 210. The battery may be to power at least one speaker 202 within the audio device 200. In some implementations, the charging base 210 may plug into an external power source, such as a wall outlet, in order to supply current to the audio device 200 to charge the battery of the audio device 200. In further implementations, the external device 210 may comprise other components, such as an additional battery to power an associated computing device, one or more additional speakers, wireless charging components to provide a charging current to the associated computing device, a light fixture, or other components.

The example audio device 200 may engage with a docking surface 212 of the charging base 210. In some implementations, any one of multiple sides 206 of a body 204 of the audio device 200 may be able to engage with the docking surface 212 of the charging base 210. In further implementations, the audio device 200 may be engaged with the docking surface 212 in different positions or locations along direction 215, relative to the charging base 210. In yet further implementations, each of the multiple sides 206, when engaged with the docking surface 212, may dispose the audio device 200 in a different position along direction 215. Additionally, the audio device 200 may be able to charge or recharge its battery when disposed on docking surface 212 at different positions along direction 215. In other words, the audio device 200 may be able to charge when any of the multiple sides 206 is engaged with the docking surface 212. Further, in some implementations, the audio device 200 may be able to translate on docking surface 212 along direction 215 when one of the multiple sides 206 is engaged with the docking surface 212.

The example audio device 200 may have an electrical communication feature 208 disposed on each of multiple sides 206 of the body 204. Together, the electrical communication feature 208 of each of the multiple sides 206 may form a pair of conductive channels 208 extending circumferentially around the body 204 of the audio device 200. The conductive channels 208 may be electrical contacts to engage with a complementary electrical communication feature 214 disposed on the charging base 210. In some implementations, the electrical communication feature 214 may be disposed on the docking surface 212. The complementary electrical communication feature 214 may be a pair of complementary electrical contacts 214. Is some implementations, the pair of complementary electrical contacts 214 may be metallic electrical contacts that may protrude out of the docking surface 212. In some implementations, the pair of complementary electrical, contacts 214 may include leaf springs, or other spring-loaded connectors such as, for example, Pogo pins. One of the pair of complementary electrical contacts 214 may extend into and electrically engage with one of the pair of conductive channels 208, when the respective side 206 is engaged with or mated to the docking surface 212. Similarly, the other of the pair of complementary electrical contacts 214 may extend into and electrically engage with the other of the pair of conductive channels 208. The pair of complementary electrical contacts 214 may electrically engage with the pair of conductive channels 208 along any portion of the channels 208. In other words, the electrical contacts 214 may electrically engage with the channels 208 regardless of the position of the audio device 200 along direction 215, relative to the charging base 210, when the audio device 200 is engaged with the docking surface 212. The complementary electrical contacts 214 may also electrically engage with the conductive channels 208 regardless of which side 206 is mated to or engaged with the docking surface 212. Therefore, the complementary electrical contacts 214 may electrically engage with the pair of conductive channels 208 when any of the multiple sides 206 is engaged with the docking surface 212, and when the audio device 200 is mated to the docking surface 212 in any position along direction 215.

When the pair of conductive channels 208 are engaged with the pair of complementary electrical contacts 214, the charging base 210 may transmit a charging current to the audio device 200. The charging current may be sufficient to charge a battery of the audio device 200, such that the audio device 200 may be subsequently removed from the charging base 210 and be able to function while separated from the charging base 210. Further, when the pair of conductive channels 208 are engaged with the pair of complementary electrical contacts 214, the charging base 210 may transmit an audio signal to the audio device 200 through the electrical contact between the channels 208 and the electrical contacts 214. The audio device 200 may then translate the received audio signal and emit audible sounds corresponding to the audio signal from the at least one speaker 202.

Figure 3A:
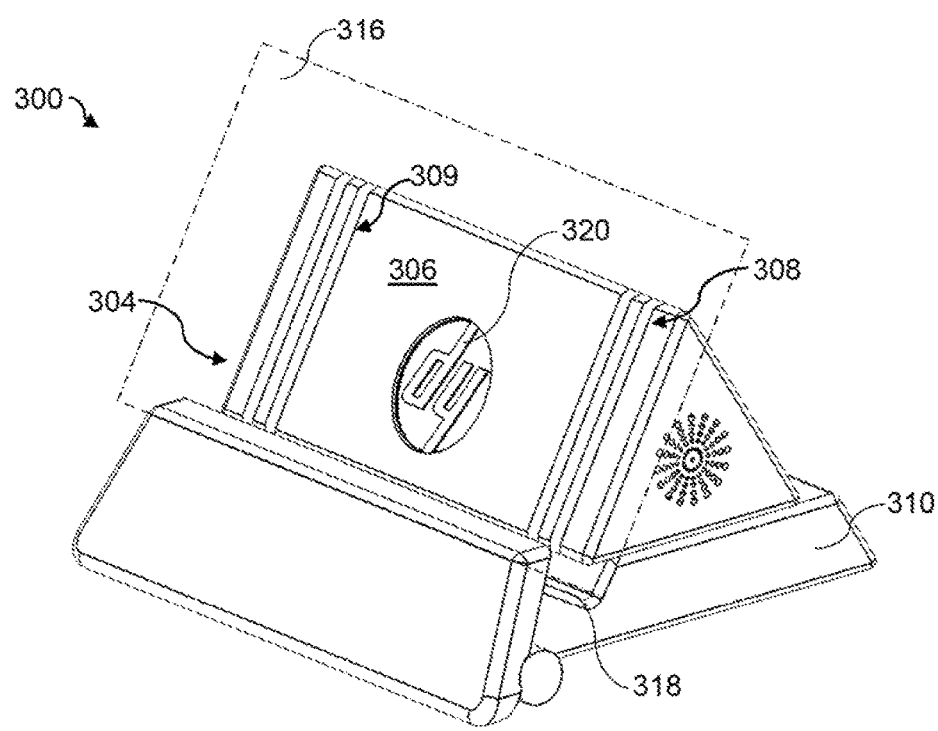
FIG. 3A is a perspective view of an audio device system comprising an example audio device.
Figure 3B:
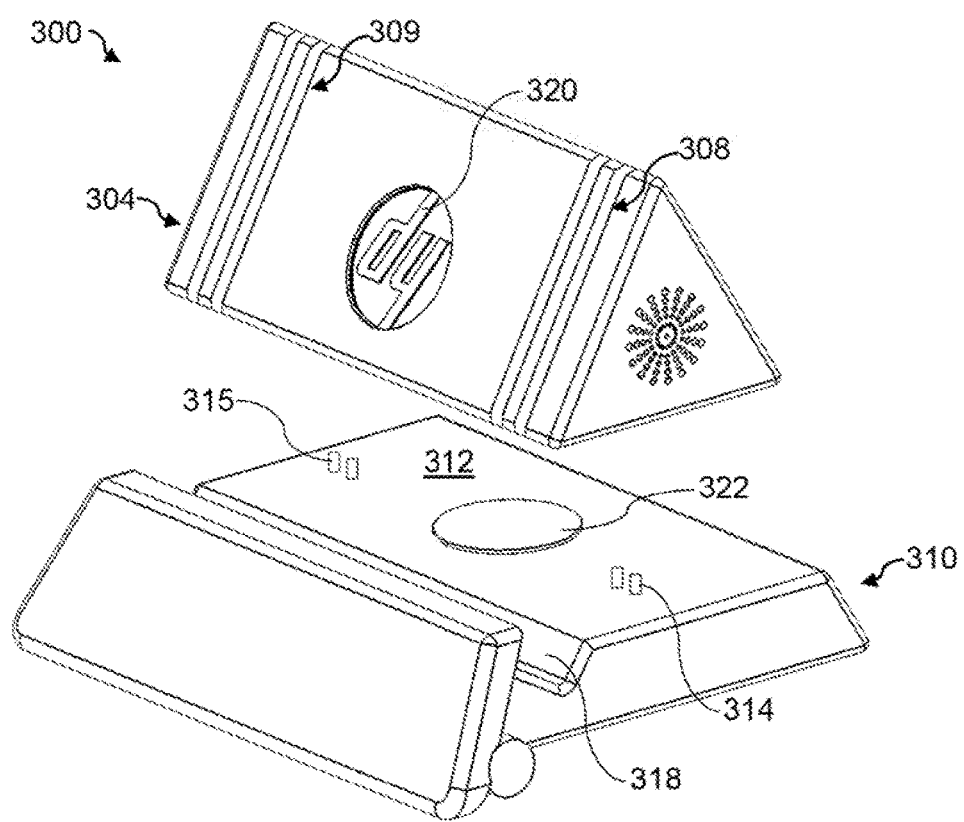
FIG. 3B is an exploded, perspective view of an audio device system comprising an example audio device.

Referring now to FIG. 3A, a perspective view of an example audio device system including an example audio device 300 is illustrated. Referring additionally to FIG. 3B, an exploded, perspective view of an example audio device system including an example audio device 300 is illustrated. Example audio device 300 may be similar to example audio devices 100 or 200. Further, the similarly named elements of example audio device 300 may be similar in function and/or structure to the elements of example audio devices 100 or 200, as they are described above. In some implementations, the audio device 300 may be engaged with an external device 310. The external device 310 may be a charging base 310. The audio device 300 may have a body 304 with multiple sides 306, each of which may separately mate to or engage with a docking surface 312 of the charging base 310. The example audio device 300 may, in some implementations, have a first pair of conductive channels 308 extending circumferentially around the body 304 on a first end of the audio device 300. This first pair of conductive channels 308 may electrically engage with a first pair of complementary electrical contacts 314 disposed on the docking surface 312 of the charging base 310, when any of the multiple sides 306 are engaged with the docking surface 312. In further implementations, the example audio device 300 may include a second pair of conductive channels 309 extending circumferentially around the body 304 on a second end of the audio device 300. The second pair of conductive channels 309 may be disposed on a generally opposite end of the body from the first pair of conductive channels 308. This second pair of conductive channels 309 may electrically engage with a second pair of complementary electrical contacts 315 disposed on the docking surface 312 of the charging base 310, when any of the multiple sides 306 are engaged with the docking surface 312. In some implementations, the first and second pair of electrical contacts, 314 and 315, are to engage with the first and second pair of conductive channels, 308 and 309, respectively, when the audio device 300 is engaged with the docking surface 312 of the charging base 310. The second pair of conductive channels 309 may be similar in structure and/or function to the first pair of conductive channels 308, and, similarly, the second pair of complementary electrical, contacts 315 may be similar in structure and/or function to the first pair of complementary electrical contacts 314.

When either the first pair of conductive channels 308 are engaged with the first pair of complementary electrical contacts 314, or the second pair of conductive channels 309 are engaged with the second pair of complementary electrical contacts 315, or both, the charging base 310 may transmit a charging, current to the audio device 300. The charging base 310 may further transmit an audio signal to the audio device 300 such that the audio device may emit an audible sound corresponding to the received audio signal.

Referring still to FIGS. 3A-B, the charging base 310 may further comprise an insertion slot 318 to receive a computing device 316 (shown in phantom). In some implementations, the computing device 316 may be a mobile device such as a mobile phone, tablet, computer, or part thereof. The charging base 310 may comprise an insertion slot 318 to receive computing devices 316 of varying or different shapes, sizes, and/or thicknesses. The computing device 316 may be to electrically communicate with the audio device 300 through a wired or wireless communication technology. The charging base 310 may further comprise an electrical communication port with which the computing device 316 may engage, and communicate with the audio device 300 through. In some implementations, the electrical communication port may be a standard communication port, such as a Universal Serial Bus (USB) port. The charging base 310 may enable wired communication between the computing device 316 and the audio device 300 through the electrical communication port and either the first pair of complementary electrical contacts 314, the second pair of complementary electrical contacts 315, or both. In some implementations, the audio device 300 is to electrically communicate with the computing device 316 when the first or second pair of complementary electrical contacts, 314 or 315, of the charging base 310 is engaged with the respective pair of electrical contacts, 308 or 309, of any of the multiple sides 306 of the body 304, and the computing device 316 is inserted into the insertion slot 318. Further, the computing device 316 may electrically engage and communicate with the audio device 300 through a wireless communication technology. Such a wireless communication technology, in some implementations, may include Wi-Fi, radio communication, or Bluetooth communication technologies, or some combination thereof. Additionally, the audio device 300 may include an electrical communication port to electrically connect to the computing device 316, or another computing device, separately from the charging base 310, using a wire or cable. In some implementations, the electrical communication port may be a USB port. In additional implementations, the electrical communication port may be an audio jack, such as a 2.5 millimeter (mm) or a 3.5 mm audio jack. In yet further implementations, the audio device 300 may use wireless or wired communication technology, as described above, to transfer a charging current or an electrical signal from a battery or other electronic component within the audio device 300 to the computing device 316. In some implementations, the audio device 300 may be used as an auxiliary power source for the computing device 316.

The audio device 300 may, in some implementations, at least partially define the insertion slot 318 to receive the computing device 316. More specifically, one of the multiple sides 306 may at least partially define the insertion slot 318 when another of the multiple sides 306 is mated to or engaged with the docking surface 312 of the charging base 310. In some implementations, one of the multiple sides 306 may at least partially define the insertion slot 318 with a certain angle relative to the charging base 310. For example, if the audio device 300 has a body 304 with three sides 306 and a cross-section of an equilateral triangle, then the side 306 that defines the insertion slot 318 may define the insertion slot 318 such that the slot has an angle of sixty degrees relative to the docking surface 312. In further implementations, the insertion slot 318 may have an angle other than sixty degrees, and/or the angle of the slot 318 may be dependent on the number of sides 306 that the body 304 has.

In further implementations, at least one of the multiple sides 306 may include a keying feature 320 to locate the side 306 on the docking surface 312, with the docking surface 312 including a complementary keying feature 322. Either the keying feature 320 or the complementary keying feature 322 may include a boss or protrusion from the respective surface, and the other may include a recess capable of receiving such a boss or protrusion. The engagement of the keying feature 320 with the complementary keying feature 322 may dictate the position of the audio device 300 on the docking surface 312 when the side 306 having the keying feature 320 is engaged with the docking surface 312. In further implementations, more than one of the sides 306 may have a keying feature 320, or all of the sides 306 may include a keying feature 320. Additionally, one or more of the multiple sides 306 may include a magnet or magnets to locate the side 306 on the docking surface 312. Accordingly, the docking surface 312 may have a complementary magnet or magnets to engage with the magnets on the side 306. In some implementations, more than one side 306 or each of the multiple sides 306 may include magnets to locate the respective side on the docking surface 312.

What is claimed is:

1. An audio device, comprising: a body having multiple sides; a speaker disposed within the body; and
    the electrical communication feature of each of the multiple sides form a pair of conductive channels extending circumferentially around the body of the audio device; the conductive channels electrical contacts to engage with a complementary electrical communication feature disposed on the charging base,
    an electrical communication feature disposed on each of the multiple sides, wherein each electrical communication feature is to facilitate electrical communication between the audio device and an external device.

2. The audio device of claim 1, wherein the electrical communication feature of each of the multiple sides comprises a pair of electrical contacts.

3. The audio device of claim 2, wherein the external device is a charging base having a pair of complementary electrical contacts to separately engage with the electrical contacts of each of the multiple sides.

4. The audio device of claim 2, wherein the pair of electrical contacts of each of the multiple sides extend the entire width of the respective side and electrically connect with the pairs of electrical contacts on each of the adjacent sides, such that the pairs of electrical contacts, together, extend circumferentially around the body.

5. The audio device of claim 4, wherein the pairs of electrical contacts each comprise a pair of conductive channels that, together with the other pairs, extend circumferentially around the body.

6. The audio device of claim 5, wherein one channel of the pair of conductive channels is to engage with a positive electrical contact of the pair of complementary electrical contacts on the charging base, and the other channel of the pair of conductive channels is to engage with a negative electrical contact of the pair of complementary electrical contacts on the charging base.

7. The audio device of claim 6, wherein a computing device is to transmit audio signals to the audio device through a wireless communication technology, or a wired communication technology.

8. An audio device system, comprising: an audio device, including: a speaker; a body enclosing the speaker and having multiple sides; and an electrical communication feature disposed on each of the multiple sides; and
    the electrical communication feature disposed on the docking surface, the pair of complementary electrical contacts on the charging base may extend into and electrically engage with the other pair of conductive channels extending circumferentially around the body of the audio device,
    a charging base, including: a docking surface to receive the audio device; and
a complementary electrical communication feature disposed on the docking surface, wherein the complementary electrical communication feature is to separately engage with the electrical communication, feature of each of the multiple sides of the body.

9. The audio device system of claim 8, wherein the electrical communication feature of each of the multiple sides comprises a pair of electrical contacts, and wherein the complementary electrical communication feature of the docking surface comprises a pair of complementary electrical contacts to separately engage with the electrical contacts of each of the multiple sides of the body.

10. The audio device system of claim 8, wherein the charging base further comprises an insertion slot to receive a computing device.

11. The audio device system of claim 10, wherein the computing device is to electrically communicate with the audio device.

12. The audio device system of claim 11, wherein the audio device is to receive a charging current from the charging base when the pair of complementary electrical contacts of the charging base is engaged with the pair of electrical contacts of any of the multiple sides of the body.

13. The audio device system of claim 12, wherein the audio device is to electrically communicate with the computing device when the pair of complementary electrical contacts of the charging base is engaged with the pair of electrical contacts of any of the multiple sides of the body, and the computing device is inserted into the insertion slot.

14. An audio device system, comprising: an audio device, including:
    a speaker enclosed within a body, wherein the body includes a first pair of conductive channels extending circumferentially around the body on a first end, and a second pair of conductive channels extending circumferentially around the body on a second end that is generally opposite from the first end; and a charging base, including: an insertion slot to receive a computing device, a docking surface to receive the audio device; and a first and second pair of complementary electrical contacts disposed on the docking surface, wherein the first and second pair of electrical contacts are to engage with the first and second pair of conductive channels, respectively, when the audio device is engaged with the docking surface of the charging base.

15. The audio device system of claim 14, wherein a computing device is to transmit audio signals to the audio device through a wireless communication technology, or a wired communication technology.

\* \* \* \* \*